Aug. 14, 1956     E. A. ROCKWELL     2,758,548
ROTARY FLUID DISPLACEMENT DEVICE AND MECHANISM THEREFOR
Filed Aug. 24, 1950     4 Sheets-Sheet 2
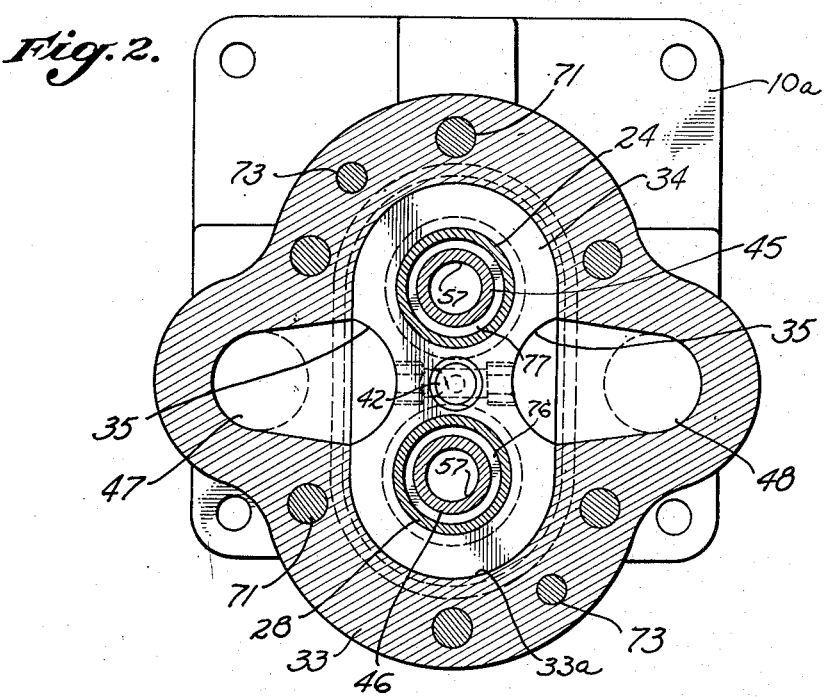
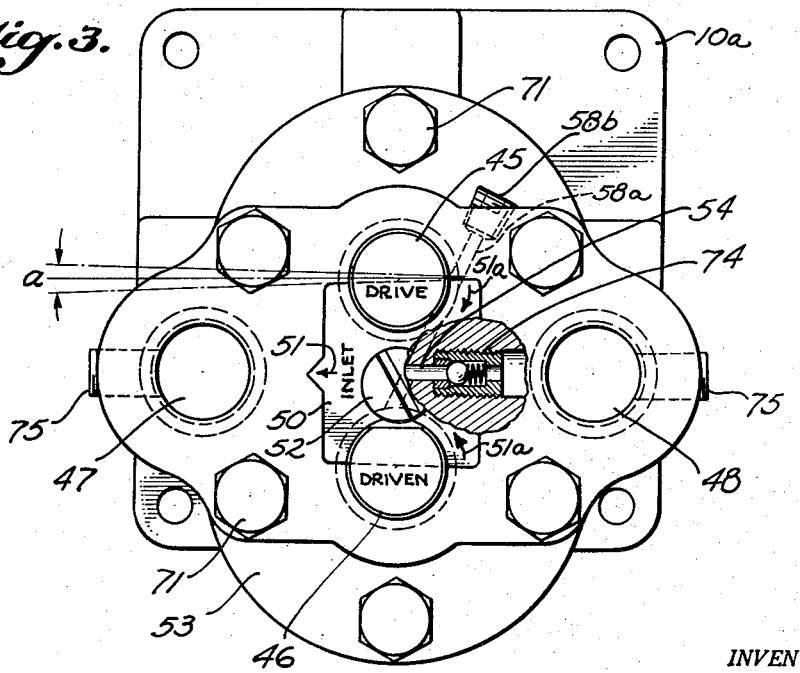
INVENTOR.
Edward A. Rockwell

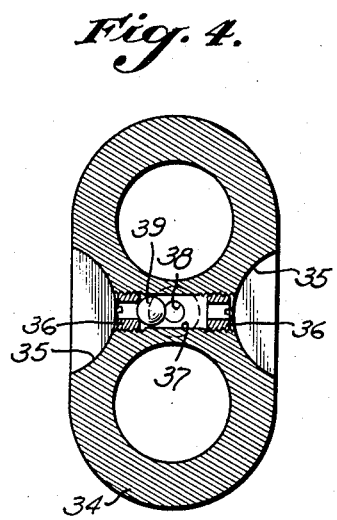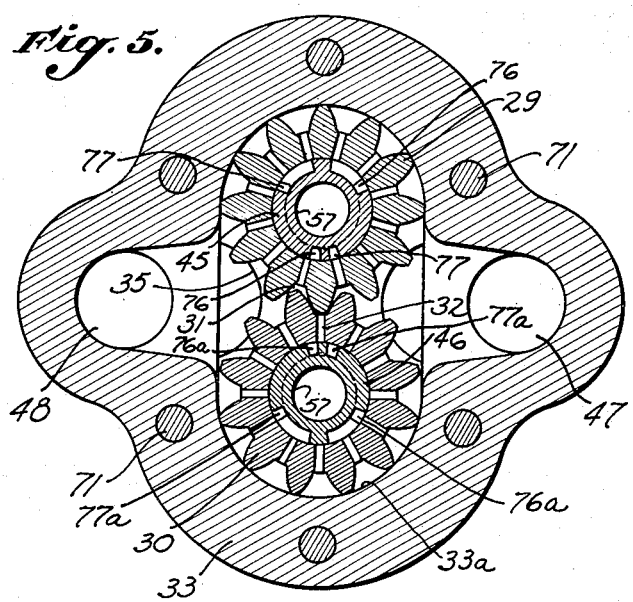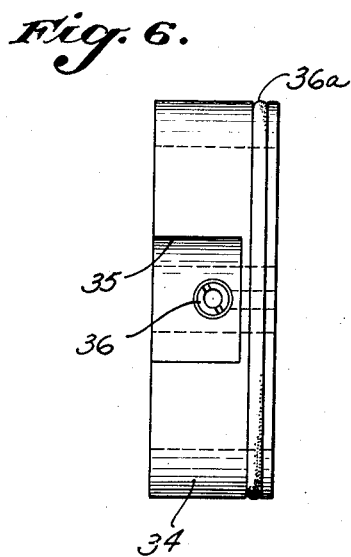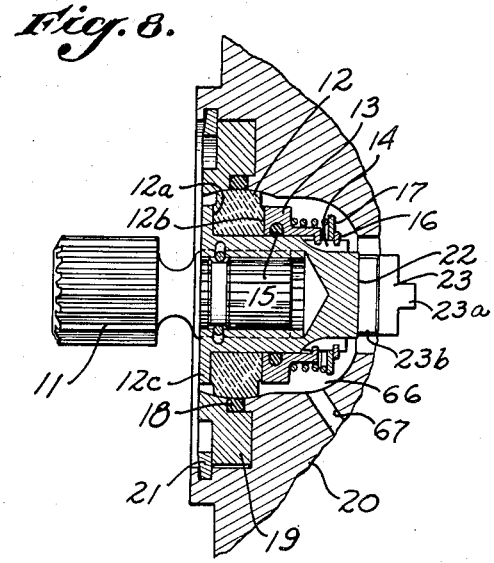

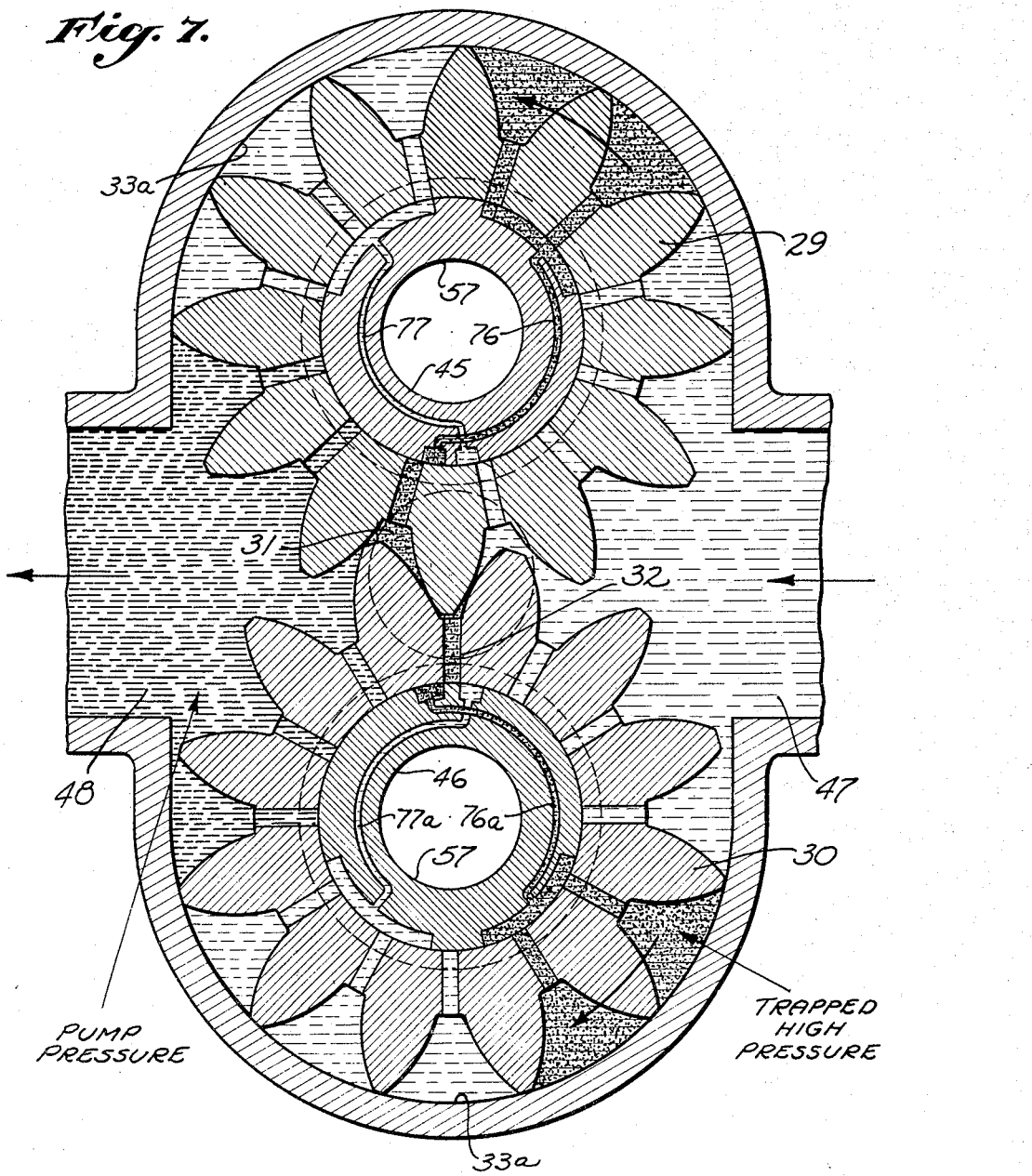

United States Patent Office 2,758,548
Patented Aug. 14, 1956

2,758,548

ROTARY FLUID DISPLACEMENT DEVICE AND MECHANISM THEREFOR

Edward A. Rockwell, Los Angeles, Calif.

Application August 24, 1950, Serial No. 181,203

8 Claims. (Cl. 103—126)

This invention relates to pressure rotary liquid displacement devices and particularly to a gear type pump having pressure balancing mechanism arranged to transmit and distribute a pressure fluid.

Various arrangements have been proposed for applying pressures resulting in slight differences of forces on the end plates or bushings of a gear pump or motor for providing a seal to prevent excess by-passage of the fluid on the side faces of the gears which otherwise would occur in a fixed clearance pump or motor. These previous arrangements generally provide the utilization of the high pressure side of the pump, for example, to act on the bushings and adapted to force them into contact with the gear faces. Some former devices provide for an exact slight difference of balance by reliefs on the gear or bushing facings, to the low pressure side of the pump. However, in these former devices, while the bushings theoretically can have a nicety of balance, the forces acting on the gears themselves have an unbalance. These former pumps, while having a high volumetric efficiency, have a relatively lower torque efficiency. So there is still much to be desired in providing a pump of a higher overall efficiency, and it is one of the main purposes of this invention to provide a pump having a high overall efficiency by a combined pressure loading and balancing arrangement for the bushings and gears to make a more effective high speed high pressure pump suitable for pumping even very low viscosity fuels such as gasoline. As this invention contemplates also, in addition to the above objects, provision for relatively large port areas in the region of the meshing point of the gears, without interfering with the pressures to be pumped, so that maximum size pipes can be connected to take care of the increased rate of flow at high operating speeds. This feature is made possible by the relatively high balancing pressures contemplated.

An important object is to provide a secondary work chamber or pumping device within the main work chamber of rotary pumps so that a small quantity of relatively high pressure fluid can be utilized for balancing and offsetting the surrounding pressures acting on the elements of the pump in such a manner as to provide high torque efficiency as well as high volumetric efficiency.

A further object is to provide valve plugs with porting channel passages adapted to be held in place in proper timing relation with respect to ports in the gears and their direction of rotation to form a rotary valve to first apply outlet pressure and in sequence a higher pressure in cooperation with passages provided in the gears themselves so as to utilize the high pressure trapped at the meshing point of the gears.

A further object is to provide separate pressure loaded sealing plugs to positively seal off from the side faces of the gears, at the region of the meshing point, the trapped pressure so as to take full advantage of the pumping action at the meshing point of the gears. The sequential operation referred to reduces any cavitation before applying the limited volume of higher pressure.

A further object is the utilization of single piece pressure loaded bushings in order that the center distances of the meshing gears can be held closely so that a true involute tooth form will run accurately on the line of action of the gears, while at the same time combining means for counterbalancing the resulting increased area.

A further object is to provide within the bushings themselves suitable passages for selecting and directing the outlet high pressure to the back facings of the bushings regardless of the direction of rotation of the gears, thus avoiding complication of passages in the walls of the pump body.

A further object is to provide on the outside of the pump a key plate having a suitable angle for holding the valve plugs in position so that in one position a pump, for example, is adapted to run in one direction, and when the plate is turned over and reversed, the pump is adapted to operate in the other direction. The geometry of the mounting of the plate being such that only one or the other position can be fixed.

It is a further object to have marked on this plate an indication which of the ports are to be connected to a source and to a place of use, and also suitable markings indicating the direction of rotation of the pump according to the setting of the plate. This key plate cooperates with and is related to the porting and balancing system of the pump.

A further object is to provide a self-aligning high pressure seal for the driving gear shaft and means for the balancing of the axial directed forces on the shaft so that minimum loading pressures against the seal are maintained at all times.

A further object is in a self-aligning secondary low pressure seal having a sealing face acting on a flat surface exterior of the pump body to effectively seal any negative pressure on the inlet side of the pump.

A further object of providing in combination with the ports in the valve plugs, of double spring loaded check valves in the cover of the pump for automatically permitting rotation of the pump in either direction in order that the seepage leakdown of the pump will flow to the low pressure side of the pump by suitable passageways in the valve plugs and cover.

It is an important object to provide higher pressures than the pump pressure for forcing the bushings away from the side faces of the gears by very limited action by the trapped pressure between the gear teeth in order that the friction against the side faces of the gears are reduced to a minimum, and the wear on these bushings is largely reduced, and it also is a main object to utilize this same pressure to balance the liquid forces acting on the gears so as to reduce the bearing loads on the bushings to a minimum, and to urge the gears to hold a minimum clearance against the cavity contour at the outlet of the pump making possible large flow areas for the ports.

All of the foregoing objects would be equally effective in a motor as well as a pump, and more particular objects, advantages, and uses of this invention will become apparent from reading the following specification in connection with the accompanying drawings.

Fig. 2 is a transverse section view taken substantially on the line 2—2 of Fig. 1.

Fig. 3 is an end elevational view showing the cover plate taken on 3—3 in direction of arrows 3—3 and a partial section through one of the relief valves.

Fig. 4 is a transverse section of one of the bushings taken substantially on the line 4—4 of Fig. 1 and showing the shuttle valve therein.

Fig. 5 is a section taken substantially on the line 5—5 of Fig. 1 showing the gears and porting valve plug arrangement.

Figure 1:
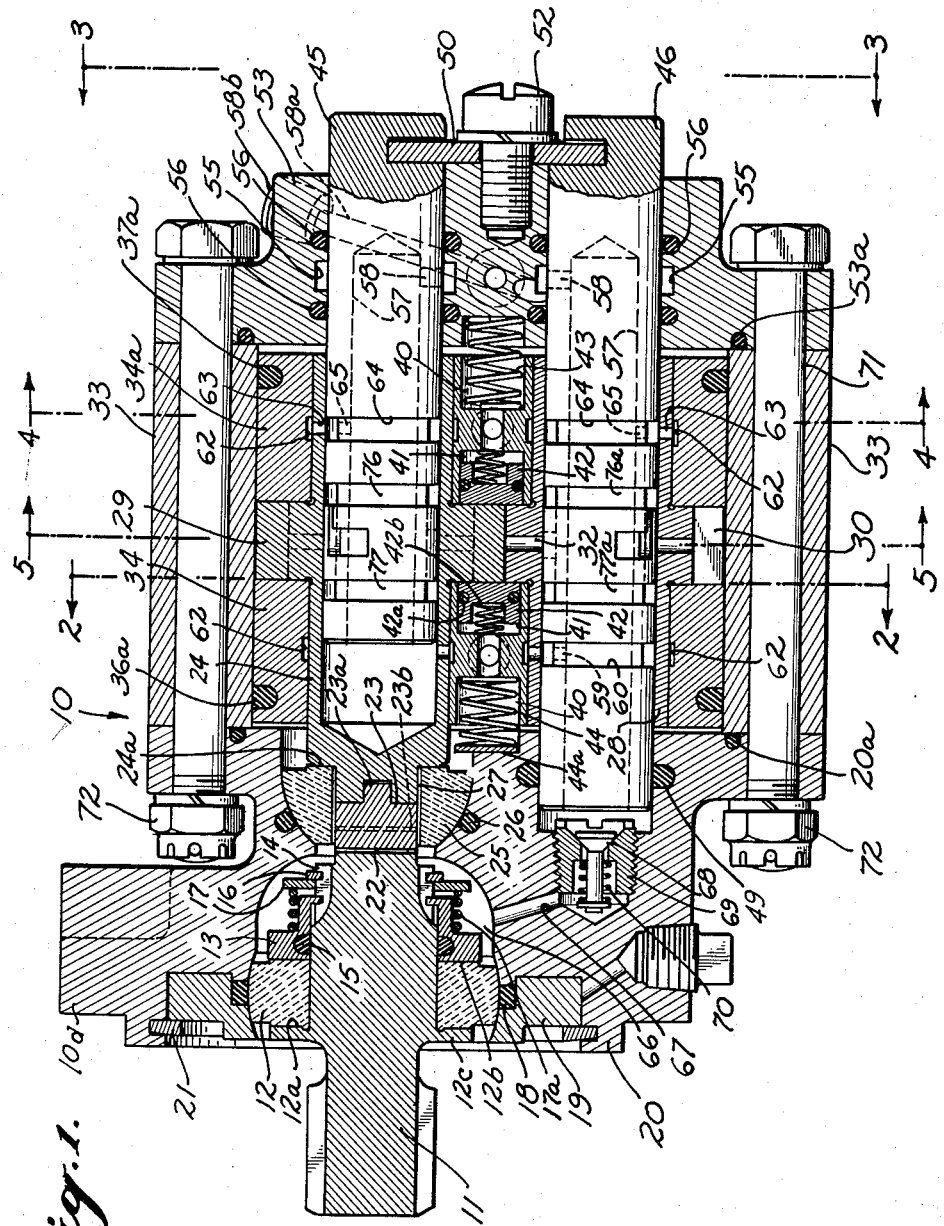
Fig. 1 is a longitudinal section taken through the axes of the gears.

Fig. 6 is a side elevation of Fig. 4 of one of the bushings or end plates showing the recessed inlet port and assembly of one of the shuttle valve seat plugs.

Fig. 7 is an enlarged schematic view of Fig. 5 wherein the valve ports in the valve plugs and the cooperating passages at the base of the gears is shown in their proper timing relation so as to accommodate the direction of rotation of the pump.

Fig. 8 shows an alternate arrangement of the driving means having a separate sheer section drive element which also provides additional self-alignment of the low pressure seal as applied to the structure of Fig. 1.

Referring to the figures of the drawings, in which the corresponding numbers refer to the same parts and connecting passages in the different figures of the drawings, 10 indicates generally a liquid pump having a mounting flange 10a suitable for mounting on the engine, for example, of an aircraft engine, having the usual internally splined drive shaft (not shown) to mate with the splined pump drive shaft 11. This shaft 11 is supported in a self-aligning bearing bushing 12 preferably of a self-lubricating material, such as some of the well-known carbon graphite compounds. This bushing has two flat parallel surfaces for providing two sealing faces 12a and 12b. A flange 12c locates the sealing portion of the drive shaft in one direction and a spring loaded slidable sealing collar 13 locates the shaft in the other direction, and the said collar is adapted to turn with the drive shaft portion by reason of the key slot 14. The seal ring 15 prevents leakage through the shaft. A snap ring 16 holds the spring retainer 17 and spring 17a on the driven portion of the shaft 11. A seal ring 18 is provided in a groove formed by the retaining collar 19 and the pump flange housing member 20 the retaining collar being held in place by the tapered snap ring 21. A transverse drive slot 22 is adapted to receive a self-aligning coupling member 23 having transverse tongues 23a and 23b at 90° apart, the tongue 23a adapted to mate with the transverse slot in the drive gear shaft 24. The drive gear shaft has a flat polished surface 24a adapted to bear against the flat polished surface of the self-aligning sealing member 25, the spherical surface of which is sealed by the seal ring 26. This bushing has an internal clearance indicated at 27, which permits the shaft 24 to bear squarely against the seal surfaces. Machined on the drive gear shaft 24 and the driven gear shaft 28 are gears 29 and 30 respectively. These gears are preferably machined to an involute tooth form having a suitable pressure angle such as, for example, 28°, to secure a trapping effect, as indicated between the teeth of the driving and driven gear at 31 which forms a secondary work chamber for the pumping fluid which is completely within the main work chamber of the pump. Between each tooth is a centrally located port, one of which is indicated at 32, drilled at the clearance of the base between each tooth. These gears are adapted to run in cavities 33a formed in the pump body housing 33 to receive the bushings 34 and 34a having flat side plate surfaces. The outer periphery of the bushings and cavity in the pump body housing are machined having a contour with arcs very close to the dimensions of the outside dimension of the gears and having parallel sides at the point of tangency of the gear circles. The bushings have semi-circular cavities, machined at 35, and each bushing has a circumferential groove for seal rings 36a and 37a. At the base of the cavities 35, there are screw-threaded valve seats 36 and an axially drilled passageway 37, communicating with the valve passage 38, provided with a ball check valve 39. The two bushing members are identical and are also provided at the meshing point of the gears with the cylindrical cavities 40 and 41. The cavities indicated at 41 on the respective bushings are adapted to receive the sealing plugs 42, having their seal rings 42a and light springs 42b. The spring 43 has sufficient force to urge all of the parts into the position shown and to overcome the friction of the seals, whereas the spring 44 held in place by the retainer plate 44a, is only of sufficient force to hold the bushing 34 normally against the side faces of the gears.

Referring to Figs. 1 and 5, the valve plugs 45 and 46 provide the valve balancing ports and overlapping channel grooves 76 and 76a for the driving and driven gears respectively. These plugs are also indicated diagrammatically in Fig. 7, and their relationship to the inlet or low pressure side of the pump indicated at 47 and the outlet or high pressure side of the pump indicated at 48 and it will be noticed that these plugs have passages which extend into the work performing chamber the enclosure of which is defined in extent by the side plates of the bushings 34 and 34a, the gears 29 and 30, and the inner contour of the pump body housing 33. The valve plug 46 is identical to the valve plug 45 with regard to the ports and passages, except that the plug 46 is longer and extends into a bore in the pump flange housing member 20, and is provided with a seal 49.

It will be apparent in Fig. 3 that there is an angle a on the key plate 50, which is symmetrical, so that if the plate is reversed and turned over, the driving and driven plugs will be rotated through half of this angle, and in which case the inlet becomes the outlet and the outlet the inlet, which is indicated by suitable markings, and the arrow projction on the plate indicated at 51 and arrows indicating direction of rotation marked on the plate. The retainer screw 52, holding the plate, is located on the pump cover 53 on the axial center of the gears but off the center horizontally between the two gears slightly; the geometry is such so as to make it impossible to assemble the plate by simply reversing the same without turning it over, and on the opposite side of the plate are the appropriate duplicate inlet and outlet markings including direction of rotation arrows 51a. While the cover plate 53 shows the outlets which are generally desirable for aircraft mounting, it is obvious that the inlet and outlet could be incorporated in the pump body housing 33, and the inlet and outlet passages eliminated in the cover. In this case, the key plate still would indicate which side of the pump is the inlet and which side the outlet. The cover plate also provides a port 54 communicating with the annular channels 55, around each valve plug, and seals on opposite sides of the channels indicated at 56, which are duplicated around each plug. There is a bore 57 on the interior of each plug, Figs. 5 and 7, and then indicated in dotted lines on Fig. 1. Each one of the plugs 45 and 46 have drilled passageways 58 indicated in dotted lines on Fig. 1. There also are small return flow passageways in the plug 46, indicated in dotted lines at 59, which communicates with the groove 60 in plug 46, and in the case of the plug 45, the drilled passageway in the gears 61 provides a return flow of fluid from the restricted annular groove 62 in the bushings 34 and 34a, which communicates with the drilled hole in the gear shaft at 63 and the groove 64 in the respective bushings 45 and 46, and a drilled passageway indicated in dotted lines at 65 in Fig. 1. These passageways and grooves, leading to the low pressure side, provides the return for the fluid in connection with the lubrication of the bearing surfaces. A further low pressure return from the chamber 66 between the low and high pressure seals, Figs. 1 and 7, is provided by the passage 67 through the check valve 68, having a valve seat plug 69 screw-threaded into the flange body housing member 20 and in which the spring 70 will provide a slight residual pressure of any entrained fluid in the chamber 66 due to any seepage which might occur from the high pressure seal. It is evident that any slight leakage of fluid will discharge through this valve to the low pressure side of the pump without building up any excess pressure in the seal chamber 66. The cover plate 53 and the flange body housing member 20 is adapted to be held in sealing relation by the circumferential seals 53a and 20a retained in grooves on the cover plate 53 and pump flange housing member 20, respectively, by six bolts 71 with the screw-threaded nuts 72, and both the flange body housing member and cover plate have two dowel pins located therein, as indicated at 73 and locating the three members accurately. The cover plate has two return check valves, one of which is indicated at 74. The retainer and seats, therefore, being adapted to be screw-threaded into the cover plate through the plugged openings 75. The check valve to the inlet side is not shown, however, it is located in precisely the same manner as the one shown in Fig. 3. These spring pressed valves retain a slight residual pressure leading to the inlet but will check off any high pressure acting on the valves from the outlet. One or the other of these valves act as a residual check valve according to the direction of rotation of the pump. In order to communicate the low pressure passages together and to these valves, there is a diagonally drilled passage 58a sealed by a pipe plug 58b.

In the operation of the device, when used as a pump, the intake 47 is connected to a supply of liquid to be pumped, and the main outlet 48 is connected to a place for utilization of the liquid and pressure generated by the pump. The direction of rotation indicated on the drawing will cause fluid to be entrained between the gear teeth cavities due to the difference of volumes produced at the pitch line and the addendum of the gear teeth, and, if it were not for the special balancing and valving arrangement, as in a conventional gear pump, the difference of pressure between the inlet and outlet side of the pump would cause pressures tending to separate the gears, and put overbalanced loads on the bushings, as well as tending to drive the outer periphery of the gear teeth against the inner walls of the pump body housing 33. Furthermore, unless the pressure between the teeth is relieved by suitable grooving means, additional very high pressures would tend to separate the gears, causing excess pressures and resultant wear and noisy operation of the pump. In this pump, the outlet pressures are communicated to the opposite face of the bushings 34 and 34a, and, since the area, tending to force the bushings into contact with the side faces of the gears 29 and 30, is more than the reactive area tending to separate the bushings, I, therefore, contemplate counterbalancing this pressure by a higher pressure giving the necessary effective force to oppose the force tending to force the bushings into contact with the gears.

It is quite evident that unless some means is provided to counterbalance the pressure against the side faces of the bushings, as well as the pressures against the bearings of the bushings, that while the pump would have a high volumetric efficiency, its mechanical efficiency would be very low due to excess friction. On the other hand, if these pressures can be properly balanced so as to float the bushings away from the side faces of the gears on a film of liquid, as well as to substantially counterbalance the separating forces of the gears, the friction to drive the pump would not be much more than that required to operate and drive a single set of gears. To effectively accomplish this result, I preferably employ two sealing plungers which always are urged against the face of the gears at the meshing point in order that the action of the gear teeth in pumping high pressures and small volumes can be effectively utilized for not only balancing the gears against the high pressure side but in order that the leakdown of the high pressure will occur on the side faces of the gears and with sufficient pressure to more than counterbalance the outlet pressure. Hence it is apparent in effect I have provided a secondary high pressure pump at the meshing point of the gears in which the action of this pump is controlled by suitably drilled passages between the gear teeth and slotted groove in the valve plugs 45 and 46.

In order that the valve events are correctly related to the direction of rotation, these plugs can be shifted a slight angle with relation to the center line of the two gears. This small angle in the pump shown is approximately 2°. In order to make the balancing effective, it also is necessary to balance the low pressure or inlet side of the pump, and, therefore, there are two systems of valve grooves in the plugs, the high pressure system being shown diagrammatically in Fig. 7 at 76 and 76a on the drive and driven valve plugs respectively. The low pressure balancing system is indicated at 77 and 77a of Fig. 7 on the drive and driven valve plugs respectively. If these plugs in Fig. 7 are rotated in the case of the drive gear in a clockwise direction, and the valve plug in the case of the driven gear in a counterclockwise direction, equal to the small angle referred to, the valve events, in relation to the running of the gears in the porting, will be identical to the other direction of rotation previously described. In this case, however, the inlet and outlet ports are reversed, and in order to accurately set the small angle, the key plate 50 in Fig. 3 is turned over so that the total 4° angle will be divided, and the plugs are then set a difference of 2°. The plate has the same inlet and outlet markings, as well as the proper direction of rotation on both the top side, as well as the underside.

It is evident that the plate cannot be assembled incorrectly for the reason of the offset mounting of the screw 42. I have estimated that the balancing pressures derived from the high pressure trap between the gear teeth may be as high as three times the outlet pressure. However, it will be noticed from the porting arrangement that the cavities between two teeth, and for a short period three teeth, constitute the arc and areas in which this high pressure acts. In any event, the high pressure is sufficient to separate the bushings at which time a reduction in the pressure of the trapped high pressure will be maintained due to the leakdown to the lower pressure areas any time that the bushings actually are moved away from the faces of the gears. In order to control the lubrication of the pressure in the gear shaft bearings bored in the bushings 34 and 34a, high pressure from the outlet side will flow towards the groove 62 and then through a small hole drilled in the driven gear and ports. With reference to Fig. 7 it is contemplated that the small port groove in the passage 76 and 76a is of a dimension at its set position to provide flow and pressure initially just prior to trapping the fluid, so as to compress any cavitation that might occur in the operation of the device.

I want it understood that, although sometimes I have referred to this invention as a pump, it can be applied to any liquid displacing device, such as a motor, in which case the inlet and outlet are reversed for the same plug timing relation, wherein advantage can be secured by the sealing and balancing arrangements contemplated by the scope of this invention, and in the claims, wherein the term "pump" is used. I want it understood that the claims are not to be limited to a pump, where they have the same equivalent function in a motor.

While I have disclosed my invention in connection with certain specific constructions, it is to be understood that these are by way of example rather than by limitation, as it is intended that the invention defined by the following claims should be given as broad a scope as permitted by the state of the art. It will be understood also that the residual check valve and plug 68 and 69 respectively can be eliminated if desired.

What I claim is:

1. A rotary liquid displacement device comprising: a housing with a work-performing chamber having an inlet and an outlet; a rotary element mounted for rotation in said chamber to transfer fluid at a first pressure from said inlet to said outlet at a second pressure, the difference between said pressures representing substantially the work accomplished in said chamber, said rotary element having side faces adapted and positioned to rotate within said chamber; at least one plate in said housing having a surface in running contact with a side face of said element; pressure means urging said plate into fluid sealing contact with said face; secondary fluid pumping means including a fluid displacement member connected to said rotary element for movement therewith and adapted to deliver a relatively small volume of fluid at a third pressure substantially greater than either of said first two pressures; and valve porting means including a passageway and a valve member adapted to open and close said passagewy one of said last two elements being fixed and the other being mechanically connected to said rotary element for movement therewith and said passageway being fluid connected to said pumping means to receive fluid therefrom and apply the same to a limited area of said plate surface to counterbalance the force exerted by said pressure means whereby to eliminate excessive friction between said plate and rotary element.

2. A rotary liquid displacement device comprising: a housing having a generally oval-shaped work chamber defined by a pair of opposed, spaced, semi-cylindrical end walls and flat, parallel side walls tangent to said cylindrical walls and joining the ends thereof; means forming an inlet adjacent one of said flat walls and an outlet adjacent the other flat wall; a pair of meshing gears mounted on axes coinciding with those of said cylindrical wall portions, said gears having the teeth tips thereof in contact with said cylindrical walls whereby rotation of said gears in said chamber transfers fluid from said inlet to said outlet, the pressures at said inlet and outlet being different and said difference representing work accomplished in said chamber; at least one plate substantially perpendicular to the axes of said gears and contoured to fit in said housing in fluid-sealing contact with said walls, said plate having a smooth inner surface in running contact with end faces of said gears; pressure means adjoining the outer surface of said plate to urge the same into fluid sealing contact with said gear faces; secondary fluid pressure generating means including at least one fluid displacement member carried by one of said gears for movement therewith to deliver, upon rotation of said gears, a relatively small volume of fluid at a pressure substantially higher than said first two pressures; and valve porting means including a passageway and valve member one of which is fixed and the other of which is connected to one of said gears for movement therewith, said passageway being connected to said fluid pressure generating means to receive fluid therefrom and place the same in pressure contact with said inner plate surface to counterbalance the force exerted by said outer pressure means, whereby to eliminate excessive friction between said plate and gears.

3. A rotary liquid displacement device comprising: a housing having a generally oval-shaped work chamber defined by a pair of opposed, spaced, semi-cylindrical end walls and flat, parallel side walls tangent to said cylindrical walls and joining the ends thereof; means forming an inlet adjacent one of said flat walls and an outlet adjacent the other flat wall; a pair of meshing gears mounted on axes coinciding with those of said cylindrical wall portions, said gears having the teeth tips thereof in contact with said cylindrical walls whereby rotation of said gears in said chamber transfers fluid from said inlet to said outlet, the pressures at said inlet and outlet being different and said difference representing work accomplished in said chamber; at least one plate substantially perpendicular to the axes of said gears and contoured to fit in said housing in fluid sealing contact with said walls, said plate having a smooth inner surface in running contact with end faces of said gears; pressure means adjoining the outer surface of said plate to urge the same into fluid sealing contact with said gear surfaces; a secondary fluid pressure generator including at least one independently movable sealing plunger engaged with faces of said gears common to that engaged by said plate, and at the mesh point of said gears to entrap fluid in the tooth spaces between successive teeth on one gear and cause said entrapped fluid to be compressed by the entry of a tooth of said other gear when said gears are rotated; and valving means including passages in said gears fluid connected to said tooth spaces to receive fluid therefrom and a fixed valve member normally closing said passages and periodically opening said passages to place said entrapped fluid in pressure contact with limited areas of said inner plate surface to counterbalance the force exerted by said outer pressure means.

4. A rotary liquid displacement device comprising: a housing having a generally oval-shaped work chamber having a pair of opposed, spaced, semi-cylindrical end walls; a pair of meshing gears mounted on axes coinciding with those of said cylindrical wall portions, said gears having the tooth tips thereof in contact with said cylindrical walls; means forming an inlet and an outlet in said chamber respectively on opposite sides of the point of mesh of said gears whereby rotation of said gears in said chamber transfers fluid from said inlet to said outlet, the pressures at said inlet and outlet being different and said difference representing work accomplished in said chamber; at least one plate substantially perpendicular to the axes of said gears and contoured to fit in said housing in fluid-sealing contact with said walls, said plate having a smooth inner surface in running contact with end faces of said gears; pressure means adjoining the outer surface of said plate to urge the same into fluid sealing contact with said gear faces; secondary fluid pressure generating means including at least one fluid displacement member carried by one of said gears to deliver, upon rotation of said gears, a relatively small volume of high pressure fluid; and valve porting means including a passageway movable with one of said gears and a fixed valve for said passageway to alternately open and close said passageway as said gears rotate, said passageway being fluid connected to said fluid pressure generating means to receive fluid therefrom and when open to place said fluid in pressure contact with said inner plate surface to counterbalance the force exerted by said outer pressure means, whereby to eliminate excessive friction between said plate and gears, said high pressure fluid being also in contact with tooth surfaces of said gears at points thereon substantially diametrically opposite the mesh point thereof.

5. A gear pump comprising: a pair of meshed gears rotatably mounted in a chamber and having the tooth tips thereof in sliding contact with cylindrical walls of said chamber; at least one floating bushing positioned against end faces of said gears and closing the ends of the tooth spaces in said gears; means forming an inlet and outlet in said chamber respectively on opposite sides of a line drawn through the axes of said gears; passage means placing outlet fluid in pressure contact with an outer surface of said bushing to urge the same into sealing contact with said gear faces; means including a fluid displacement member carried by one of said gears to generate a small volume of fluid at a pressure substantially higher than said outlet pressure; and distributing means including a passageway one portion of which is movable with at least one of said gears and another portion of which is fixed, said passageway being arranged to deliver said higher pressure fluid to selected tooth spaces in said gears, said selected spaces being offset from said line in a direction opposite that of said outlet whereby to counterbalance both the axial pressure of said bushing against said gears and the reactive radial forces in said gears due to outlet fluid pressure thereagainst.

6. A gear pump comprising: a pair of meshed gears rotatably mounted in a chamber and having the tooth tips thereof in sliding contact with cylindrical walls of said chamber; at least one floating bushing positioned against end faces of said gears and closing the ends of the tooth spaces in said gears; means forming an inlet and outlet in said chamber respectively on opposite sides of a line drawn through the axes of said gears; passage means placing outlet fluid in pressure contact with an outer surface of said bushing to urge the same into sealing contact with said gear faces; a secondary fluid pressure generator including at least one independently moving sealing plunger engaged with faces of said gears common to that engaged by said bushing, and at the mesh point of said gears, to entrap fluid in the tooth spaces between successive teeth on one gear and cause said entrapped fluid to be compressed by the meshing entry of a tooth of said other gear when said gears are rotated; and distributing means including a passageway one portion of which is movable with at least one of said gears and another portion of which is fixed, said passageway being arranged to deliver said entrapped fluid to selected tooth spaces in said gears said selected spaces being offset from said line in a direction opposite that of said outlet whereby to counterbalance both the axial pressure of said bushing against said gears and the reactive radial forces in said gears due to outlet fluid pressure thereagainst.

7. The construction of claim 6 further characterized in that said distributing means includes a normally nonrotatable cylindrical plug coaxially positioned in sealing contact within each gear, said plug having the fixed portions of said passage formed as offset surface channels therein positioned to align successively with radial passages in said gears from the tooth spaces therein at selected peripheral positions around said gears said radial passages being the movable portions of said passageway.

8. The construction of claim 7 further characterized in that said plugs are movable between two selective positions whereby to reverse the operative direction of said pump.

References Cited in the file of this patent

UNITED STATES PATENTS

| | | |
|---|---|---|
| 1,418,741 | Stallman | June 6, 1922 |
| 1,694,805 | Wiltse | Dec. 11, 1928 |
| 1,771,863 | Schmidt | July 29, 1930 |
| 1,854,260 | Hoffmann | Apr. 19, 1932 |
| 1,909,418 | Norwood | May 16, 1933 |
| 1,912,737 | Svenson | June 6, 1933 |
| 1,912,738 | Svenson | June 6, 1933 |
| 2,029,742 | Sieverts | Feb. 4, 1936 |
| 2,159,748 | Miller et al. | May 23, 1939 |
| 2,212,994 | Vrolix | Aug. 27, 1940 |
| 2,247,454 | Thomson | July 1, 1941 |
| 2,266,820 | Smith | Dec. 23, 1941 |
| 2,270,222 | Rea et al. | Jan. 13, 1942 |
| 2,278,795 | Patton | Apr. 7, 1942 |
| 2,336,294 | Rea | Dec. 7, 1943 |
| 2,364,469 | Orr | Dec. 5, 1944 |
| 2,400,485 | Cardillo | May 21, 1946 |
| 2,420,622 | Roth et al. | May 13, 1947 |
| 2,424,751 | Heckert | July 29, 1947 |
| 2,456,651 | Schmiel | Dec. 21, 1948 |
| 2,471,915 | Thacher | May 31, 1949 |
| 2,484,917 | Vertson | Oct. 18, 1949 |
| 2,487,721 | Minshall | Nov. 8, 1949 |
| 2,491,365 | Ernst | Dec. 13, 1949 |